United States Patent
Wang et al.

(10) Patent No.: US 9,081,223 B2
(45) Date of Patent: Jul. 14, 2015

(54) CAPACITIVE IN CELL TOUCH PANEL AND DISPLAY DEVICE

(71) Applicant: Beijing BOE Optoelectronics Technology Co., Ltd., Beijing (CN)

(72) Inventors: Haisheng Wang, Beijing (CN); Xue Dong, Beijing (CN); Xiaoliang Ding, Beijing (CN); Shengji Yang, Beijing (CN); Hongjuan Liu, Beijing (CN); Weijie Zhao, Beijing (CN); Yingming Liu, Beijing (CN); Tao Ren, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 22 days.

(21) Appl. No.: 14/052,991

(22) Filed: Oct. 14, 2013

(65) Prior Publication Data

US 2014/0104510 A1   Apr. 17, 2014

(30) Foreign Application Priority Data

Oct. 15, 2012   (CN) .......................... 2012 1 0390659

(51) Int. Cl.
*G02F 1/1335*   (2006.01)
*G02F 1/1343*   (2006.01)
(Continued)

(52) U.S. Cl.
CPC ............ *G02F 1/13338* (2013.01); *G06F 3/044* (2013.01); *G06F 3/0412* (2013.01)

(58) Field of Classification Search
CPC .......... G02F 1/13328; G02F 1/136213; G02F 2001/13312; G02F 1/136227; G02F 1/136286; G06F 3/0412; G06F 3/045; G06F 3/044
USPC ...................................... 349/12, 38
See application file for complete search history.

(56) References Cited

U.S. PATENT DOCUMENTS

| | | | |
|---|---|---|---|
| 2014/0048854 A1* | 2/2014 | Wang et al. | 257/254 |
| 2014/0055685 A1* | 2/2014 | Wang et al. | 349/12 |

(Continued)

FOREIGN PATENT DOCUMENTS

| | | |
|---|---|---|
| CN | 101364157 A | 2/2009 |
| CN | 102314248 A | 1/2012 |

(Continued)

OTHER PUBLICATIONS

Notice of Preliminary Rejection from the Korean Patent Office for corresponding Korean application 10-2013-0122567 dated Aug. 28, 2014 with English translation.

(Continued)

*Primary Examiner* — Mike Qi
(74) *Attorney, Agent, or Firm* — Frommer Lawrence & Haug LLP; Ronald R. Santucci

(57) ABSTRACT

The present invention discloses a capacitive in cell touch panel and display device, wherein touch sensing electrodes are provided on a color filter substrate, the whole common electrode layer of the TFT array substrate is segmented into a plurality of strip-shaped structures functioning as touch driving electrodes, and the touch driving electrodes are driven in a time-sharing manner to achieve the touch function and the display function in a time-sharing manner. Since in the touch panel according to the present invention, structure of the common electrode layer of the TFT array substrate is altered to form the touch driving electrodes, it is not necessary to add a new film on the existing TFT array substrate and only an additional process needs to be added to segment the whole common electrode layer into a plurality of strip-shaped structures, reducing the production cost and increasing the production efficiency.

14 Claims, 7 Drawing Sheets

(51) Int. Cl.
*G02F 1/1333* (2006.01)
*G06F 3/041* (2006.01)
*G06F 3/044* (2006.01)

(56) References Cited

U.S. PATENT DOCUMENTS

2014/0111710 A1* 4/2014 Yang et al. .................. 349/12
2014/0118299 A1* 5/2014 Wang et al. ................. 345/174

FOREIGN PATENT DOCUMENTS

| CN | 102402330 A | 4/2012 |
| CN | 102411460 A | 4/2012 |
| CN | 102707523 A | 10/2012 |
| KR | 10-2012-0045288 A | 5/2012 |

OTHER PUBLICATIONS

Notification of the First Office Action and search report issued by the Chinese Patent Office for priority application 201210390659.3 dated Dec. 25, 2014 with English translation.

* cited by examiner

CAPACITIVE IN CELL TOUCH PANEL AND DISPLAY DEVICE

TECHNICAL FIELD

The present invention relates to the field of display technology, in particular to a capacitive in cell touch screen and display device.

BACKGROUND

With the rapid development of display technology, touch panels have gradually spread throughout people's lives. Currently, the touch panels may be classified by construction into: add on mode touch panel, on cell touch panel, and in cell touch panel. Wherein, as for the add on mode touch panel, the touch panel and the liquid crystal display screen are manufactured separately and then bonded together to provide a liquid crystal display screen with touch capabilities. The add on mode touch panel has defects such as higher production cost, low light transmittance, and thicker module. As for the in cell touch panel, due to the fact that the touch electrode of the touch panel is embedded inside the liquid crystal display screen, the entire module can be thinned and the production cost of the touch panel can be greatly reduced, thus being favored by the major panel manufacturers.

An existing capacitive in cell touch panel is achieved by additionally providing touch scanning lines and touch sensing lines directly on an existing thin film transistor (TFT) array substrate, that is, two layers of strip-shaped ITO (Indium Tin Oxides) electrodes, which are intersected on different planes, are made on the surface of the TFT array substrate, these two layers of ITO electrodes function as the touch driving lines and the touch sensing lines of the touch panel respectively, and an inductive capacitor is formed at the intersection of the two layers of ITO electrodes on different planes. The operation process of the touch panel is as follows: when a touch driving signal is applied to the ITO electrode functioning as touch driving lines, a voltage signal from the touch sensing line coupled via the inductive capacitor is detected; during this process, when a human body contacts the touch panel, electric field of the human body will act on the inductive capacitor no that capacitance of the inductive capacitor will change, which in turn change the voltage signal coupled from the touch sensing line. Based on the change of the voltage signal, location of the touch point can be determined.

When designing the above capacitive in cell touch panel, it is necessary to add a new film on the existing TFT array substrate, which will complicate the structure of the TFT array substrate; new processes also need to be added when manufacturing the TFT array substrate, which will increase the production cost; and when designing the above capacitive in cell touch panel, it is necessary to utilize two driving chips (IC) simultaneously no as to achieve touch driving and display driving respectively, which will increase the cost.

SUMMARY

The present invention provides a capacitive in cell touch panel and display device, for realizing a capacitive in cell touch panel of low cost.

A capacitive in cell touch panel according to the present invention includes: a color filter substrate, a TFT array substrate, and a liquid crystal layer enclosed between the color filter substrate and the TFT array substrate, a plurality of pixel units arranged in a matrix form are provided on the TFT array substrate, the color filter substrate includes a plurality of touch sensing electrodes extending along the column direction of the plurality of pixel units; the TFT array substrate includes a plurality of touch driving electrodes extending along the row direction of the plurality of pixel units, the touch driving electrodes together constitute a common electrode layer of the TFT array substrate; and within a time period for displaying one frame of images, the touch driving electrodes are used for transferring common electrode signals and touch scanning signals in a time-sharing manner.

A display device according to the present invention includes the capacitive in cell touch panel provided by the present invention.

Advantageous effects of the present invention are as follows.

In the capacitive in cell touch panel and the display device according to the present invention, the touch sensing electrodes are provided on the color filter substrate, the whole common electrode layer of the TFT array substrate is segmented into a plurality of strip-shaped structures functioning as the plurality of touch driving electrodes, and the plurality of touch driving electrodes are driven in a time-sharing manner to achieve the touch function and the display function in a time-sharing manner. Since in the touch panel according to the present invention, the structure of the common electrode layer of the TFT array substrate is altered to form the plurality of touch driving electrodes so that the altered common electrode layer achieves both the common electrode function and the touch driving function, it is not necessary to add a new film on the existing TFT array substrate so that the resultant TFT array substrate is simple in structure, and only an additional process of segmenting the whole common electrode layer into a plurality of strip-shaped structures is required, such that the production cost is reduced and the production efficiency is increased. Moreover, since the touch function and the display function are driven in a time-sharing manner, on one hand the chip for driving the display function and the chip for driving the touch function can be integrated to further reduce the production cost, on the other hand mutual interference between the display function and the touch function can be reduced by the time-sharing driving, such that the image quality and the touch accuracy can be improved.

DETAILED DESCRIPTION OF THE PREFERRED EMBODIMENTS

Figure 1:
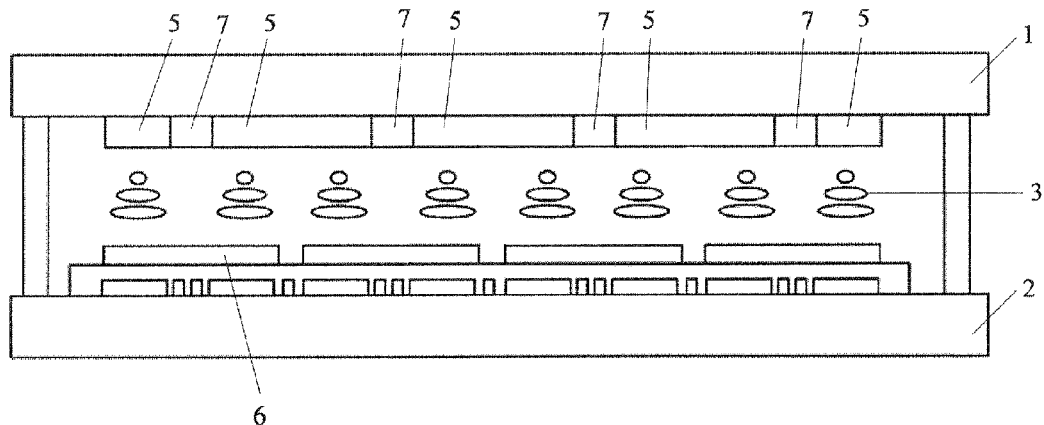
FIG. 1 is a schematic view of a structure of a capacitive in cell touch panel according to an embodiment of the present invention.

At present, liquid crystal display technology providing a wide viewing angle mainly includes In-Plane Switch (IPS) technology and Advanced Super Dimension Switch (ADS) technology, and in the ADS technology, a multidimensional electric field is formed by the electric field generated between edges of slit electrodes on the same plane and the electric field generated between the layer of the slit electrodes and the layer of the plate electrode, so that the liquid crystal molecules with various orientations between slit electrodes and directly above the plate electrode are rotated, thus improving work efficiency of the LCD and increasing light transmittance. The ADS technology can improve the image quality of the TFT-LCD product and can achieve advantages such as high resolution, high light transmittance, low power consumption, wide viewing angle, high aperture ratio, low color difference, no push Mura etc.

The present invention proposes a new capacitive in cell touch panel based on the traditional ADS technology and an important improvement in ADS technology (i.e. high aperture ratio Advanced Super Dimension Switch, HADS).

Hereafter, specific embodiments of the capacitive in cell touch panel and the display device according to the present invention will be described in detail in conjunction with the accompanying drawings.

In the drawings, thickness and shape of each layer of film don't reflect the actual proportion of the TFT array substrate or the color filter substrate, but intended to illustrate contents of the present invention schematically.

FIG. 1 is a vertical cross-sectional view of a capacitive in cell touch panel according to an embodiment of the present invention. As shown in FIG. 1, the capacitive in cell touch panel according to the embodiment of the present invention includes: a color filter substrate 1, a TFT array substrate 2, and a liquid crystal layer 3 enclosed between the color filter substrate 1 and the TFT array substrate 2, a plurality of pixel units 4 arranged in a matrix form are provided on the TFT array substrate 2, the color filter substrate 1 is provided with a plurality of touch sensing electrodes 5 extending along the column direction of the plurality of pixel units 4, the TFT array substrate 2 is provided with a plurality of touch driving electrodes 6 extending along the row direction of the plurality of pixel units 4, all the touch driving electrodes 6 constitute the common electrode layer of the TFT array substrate, and within a time period for displaying one frame of images, the plurality of touch driving electrodes 6 are used for transmitting common electrode signals and touch scanning signals in a time-sharing manner.

Generally, on the TFT array substrate of the traditional ADS mode liquid crystal panel, the common electrode is located in the lower layer functioning as a plate electrode (closer to the base substrate), the pixel electrode is located in the upper layer functioning as a slit electrode (closer to the liquid crystal layer), and an insulating layer is provided between the pixel electrode and the common electrode. However, on the TFT array substrate of the HADS mode liquid crystal panel, the pixel electrode is located in the lower layer functioning as a plate electrode (closer to the base substrate), the common electrode is located in the upper layer functioning as a slit electrode (closer to the liquid crystal layer), and an insulating layer is provided between the pixel electrode and the common electrode.

Figure 3:
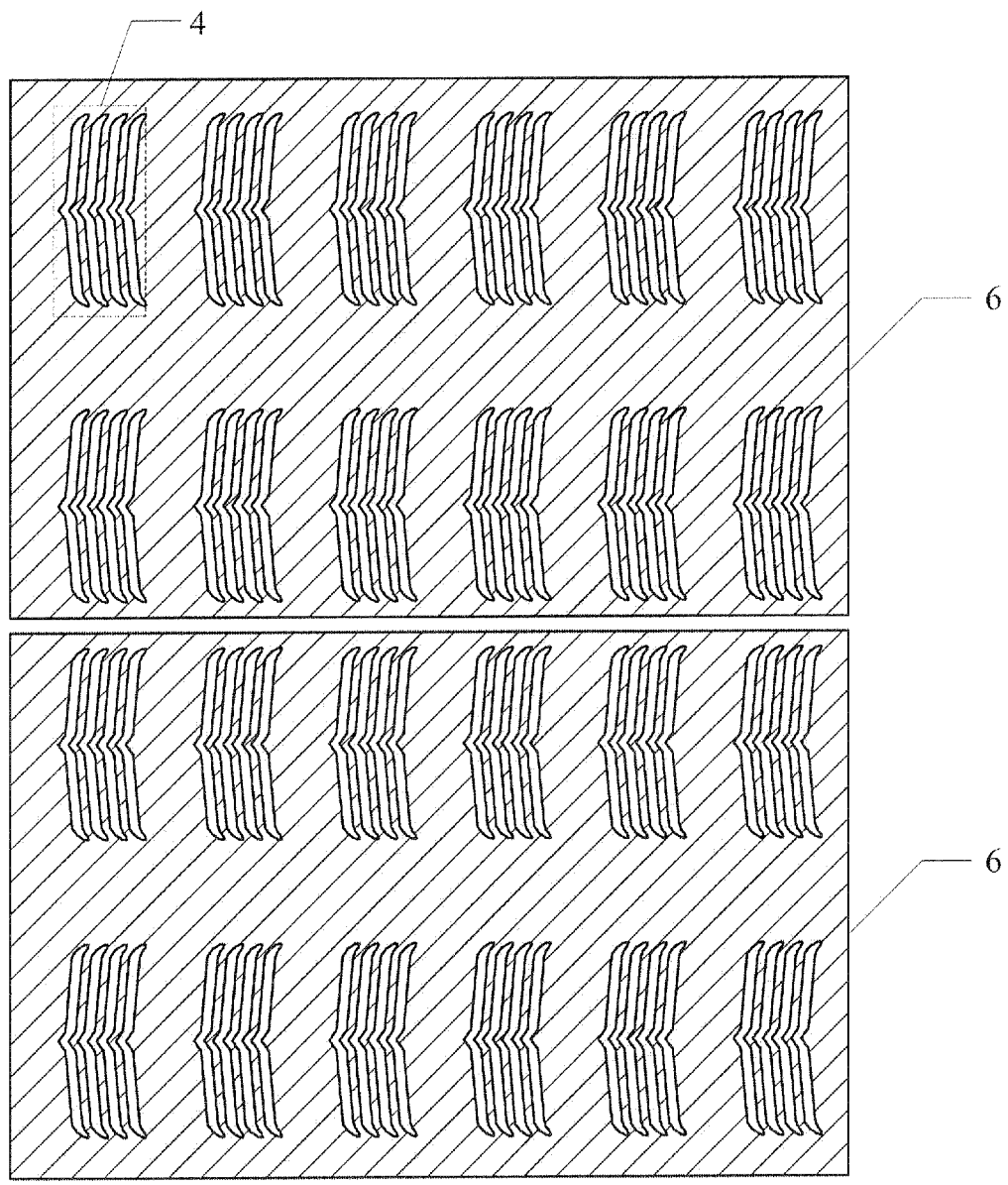
FIG. 3 is a graphically schematic view of touch driving electrodes according to an embodiment of the present invention.

Therefore, in the touch panel according to the embodiment of the present invention, according to a specific mode of the liquid crystal display panel using the touch panel, each of the touch driving electrodes 6 constituting the common electrode layer can be configured to have a slit-shaped ITO electrode structure or a plate-shaped ITO structure at a position corresponding to the aperture area of the pixel unit 4. That is, as shown in FIG. 3, in the HADS mode, each touch driving electrode 6 is comprised of slit-shaped ITO electrodes, in particular, the slit-shaped ITO electrodes are the ITO electrodes having slits in the aperture area of the pixel unit. In the ADS mode, each touch driving electrode 6 is comprised of a plate-shaped electrode so as to satisfy requirements of the liquid crystal display, and the touch driving electrode 6 can pass through the slit areas of the pixel electrodes and form an inductive capacitor together with the touch sensing electrode 5 on the color filter substrate. Since the particular structures of the ADS mode and HADS mode liquid crystal panels belong to the prior art, the related description will be omitted.

In addition, in order to reduce interference of other signals on the TFT array substrate (such as electric signals on the gate signal lines, the data signal lines, or the pixel electrodes) to the electric signals transferred in the touch driving electrodes, the common electrode layer constituted by all the touch driving electrodes 6 is generally provided above the pixel electrodes of the TFT array substrate, that is, the HADS mode is employed to avoid the problem that other signals interfere the touch driving electrodes 6 as much as possible.

In the LCD display mode, a constant voltage signal is applied to the common electrode layer, and different electric signals are applied to the pixel electrodes via TFT switches, so electric fields are generated by the common electrode and the pixel electrodes to control rotation of the liquid crystal molecules. In the above capacitive in cell touch panel according to the embodiment of the present invention, the whole common electrode layer in the TFT array substrate is segmented into a plurality of strip-shaped structures functioning as the touch driving electrodes, the touch driving electrodes are driven in a time-sharing manner to achieve the touch function and the display function in a time-sharing manner. Since the structure of the common electrode layer of the TFT array substrate is altered so as to make it achieve both the common electrode function and the touch driving function simultaneously, so it is not necessary to add a new film on the existing TFT array substrate and it is only required to add an additional process to segment the whole common electrode layer into a plurality of strip-shaped structures on that production cost is reduced and production efficiency is increased. Moreover, since the touch function and the display function are driven in a time-sharing manner, on one hand the chip for driving the display function and the chip for driving the touch function can be integrated so as to further reduce the production cost, on the other hand mutual interference between the display function and the touch function can be reduced by the time-sharing driving so that the image quality and the touch accuracy can be improved.

In the following, a particular structure of the common electrode layer of the above touch panel will be described in detail.

In a specific embodiment, depending on the required touch accuracy, the common electrode layer is segmented into a plurality of touch driving electrodes 6 of appropriate widths. Generally, the width of each touch driving electrode 6 is preferably within the range of 2 mm to 6 mm. Moreover, the touch accuracy of the touch panel is generally of the order of millimeter, and the display accuracy of the liquid crystal display screen is generally of the order of micrometer, so it can be seen that the display accuracy is greatly larger than the touch accuracy. Therefore, each touch driving electrode 6 generally corresponds to several rows of pixel units 4 (for example, as shown in FIG. 1, one touch driving electrode 6 corresponds to two rows of pixel units 4), and this is not limited herein.

Figure 2:
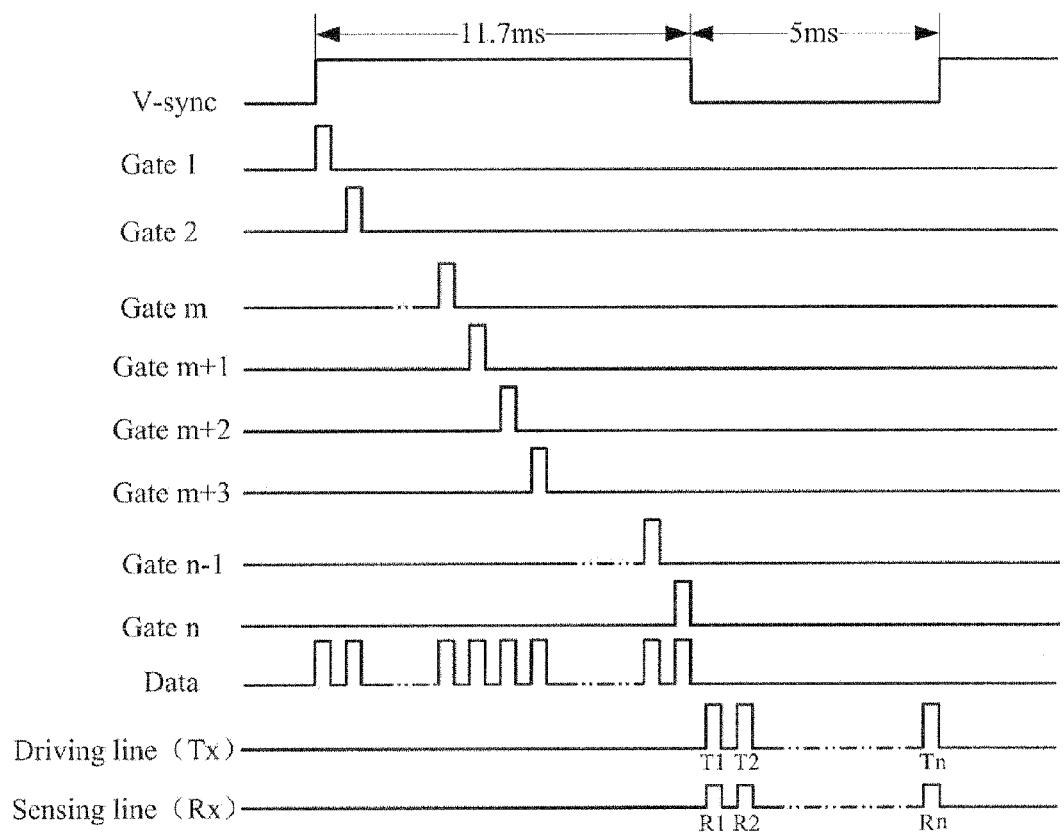
FIG. 2 is a driving timing diagram of a touch panel according to an embodiment of the present invention.

In addition, the touch driving electrode 6 in the above touch panel according to the embodiment of the present invention shall provide both touch function and display function, so it is necessary for the touch driving electrode 6 to employ a design of time-sharing driving. For example, in the driving timing diagram shown in FIG. 2, the preceding 11.7 mm in one frame (V-sync) can be used for display, and during this time period, Gate 1, . . . , Gate n are scanned line by line, and accordingly the touch driving electrodes function as the common electrode and are applied with a constant common electrode signal by an IC chip connected to the touch driving electrodes, so that the display function is achieved; the later 5 ms in one frame can be used for detection of touch, and during this time period, touch scanning signals T1, T2, . . . , Tn are respectively applied to the touch driving electrodes by an IC chip connected to the touch driving electrodes, and the touch sensing electrodes detect the touch sensing signals R1, R2, . . . , Rn respectively so that the touch function is achieved. The above example is just to illustrate ratio of time used for driving the display function and time used for driving the touch function in one frame, and in fact the ratio can be determined depending on capability of the IC chip on the signal frequency, and this is not limited herein.

In the following, a method for introducing signals to the touch driving electrodes 6 in the common electrode layer of the above touch panel will be described in detail.

In a specific embodiment, since the common electrode layer is segmented into a plurality of touch driving electrodes 6 extending along the row direction of the pixel units 4, signal lines corresponding to respective touch driving electrodes 6 may be arranged at the periphery of the TFT array substrate and corresponding electric signals are respectively input to the signal lines when performing the touch function and the display function. In the above method for introducing signals, since the electric signals are input to the touch driving electrodes 6 at the periphery, when the touch driving electrodes 6 are applied in a large size touch panel, it is apt to cause the problem of unstable signals transferred on the touch driving electrodes 6. In order to ensure stability of the signal transfer in the large size touch panel, metal signal lines corresponding to respective touch driving electrodes 6 can be separately arranged on the TFT array substrate, no as to achieve the function of introducing signals to the touch driving electrodes 6. However, metal signal lines separately arranged will occupy a part of the display area of the liquid crystal display screen, resulting in reduction of the aperture ratio.

Figure 4:
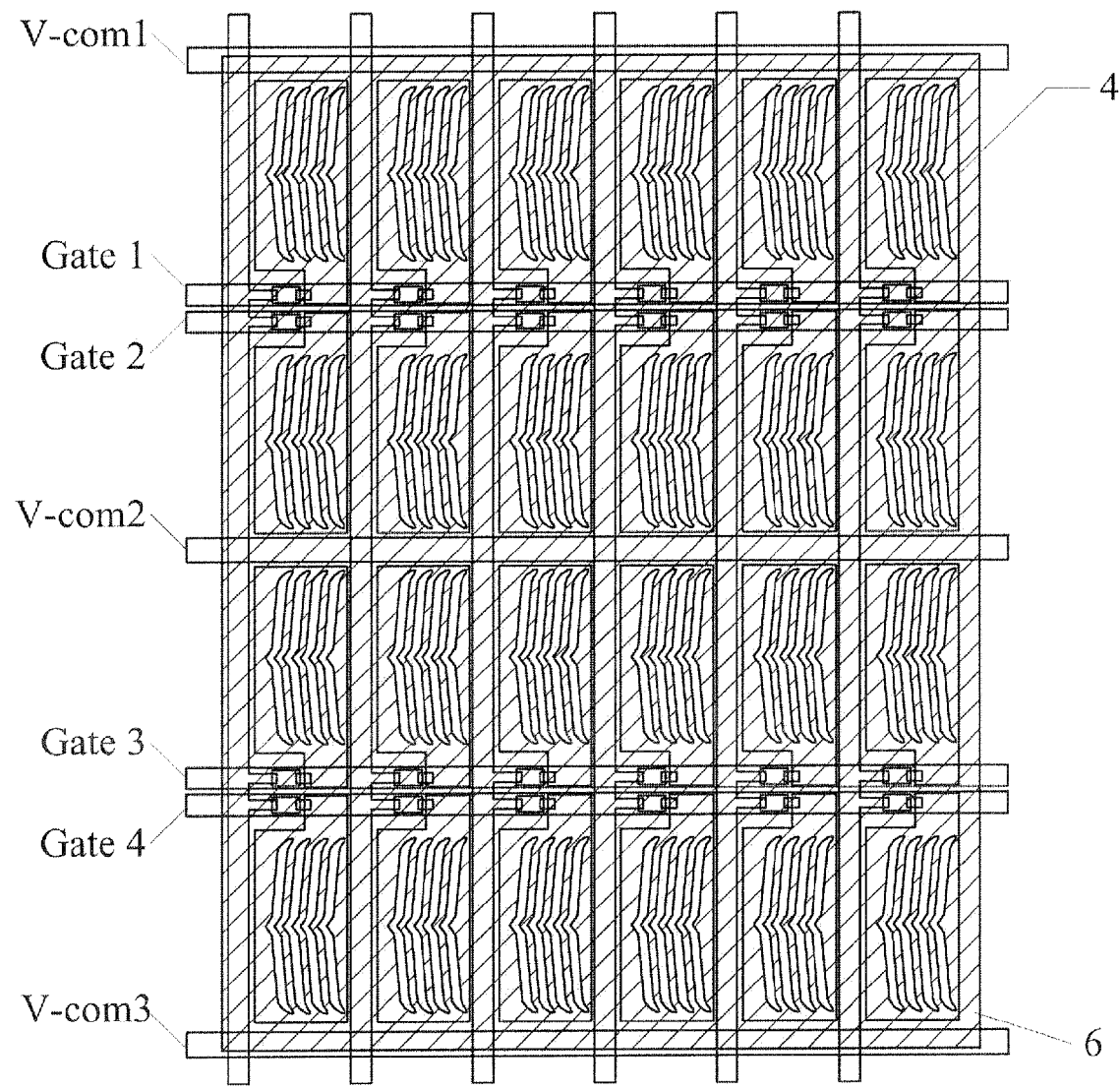
FIG. 4 is a schematic view of one example structure of a TFT array substrate according to an embodiment of the present invention.

Preferably, in order to stabilize electric signals on the touch driving electrodes 6 to the largest extent while ensuring the aperture ratio of the large size touch display panel to be maximum, the structure of the pixel units on the TFT array substrate of the touch panel according to embodiments of the present invention may employ the one illustrated in FIG. 4 in which every two adjacent rows of pixel units 4 on the TFT array substrate constitute one pixel units set, and two gate signal lines (for example, Gate 1 and Gate 2, Gate 3 and Gate 4 as shown in FIG. 4) are provided between two adjacent rows of pixel units 4 to provide gate scanning signals to these two rows of pixel units respectively. So TFT switches for the two adjacent rows of pixel units 4 can be designed together and area of the black matrix for blocking the TFT switches and the gate signal lines can be accordingly reduced, thus facilitating increase of the aperture ratio of the touch display panel.

Further, positions of the gate signal lines and the TFT switches of two adjacent rows of pixel units 4 are altered in the pixels units in FIG. 4, on areas for the gate signal lines between two adjacent pixel units sets can be saved. Thus, as shown in FIG. 4, in the saved areas (i.e. gap between two adjacent pixel units sets), common electrode signal lines V-com1, V-com2, V-com3 are provided which are inplane with the gate signal lines Gate 1 and Gate 2, and Gate 3 and Gate 4. These common electrode signal lines are electrically connected to corresponding touch driving electrodes 6 through via holes to apply signals to them, so as to stabilize electric signals on the touch driving electrodes 6 to the largest extent while ensuring the aperture ratio of the large size touch display panel to be maximum.

Further, since the common electrode layer is generally made of ITO material and resistance of the ITO material is relatively high, in order to reduce resistance of each electrode of the common electrode layer and increase signal to noise ratio (SNR) of electric signals transferred on respective electrodes of the common electrode layer, electrodes of the common electrode layer can be electrically connected to corresponding common electrode signal lines through a plurality of via holes respectively. This is equivalent to make ITO electrodes and a plurality of metal resistors constituted by the common electrode signal lines to be connected in parallel respectively so that resistance of each electrode can be reduced to the largest degree and accordingly the SNR of signals transferred on the respective electrodes can be increased.

Moreover, as shown in FIG. 4, although there is no ITO common electrode provided between two adjacent pixel units sets, the common electrode signal line additionally provided within the area between two adjacent pixel units sets can compensate for the common electrode signal to generate an electric field together with an adjacent pixel electrode to ensure normal deviation of the liquid crystal molecules.

Figure 5:
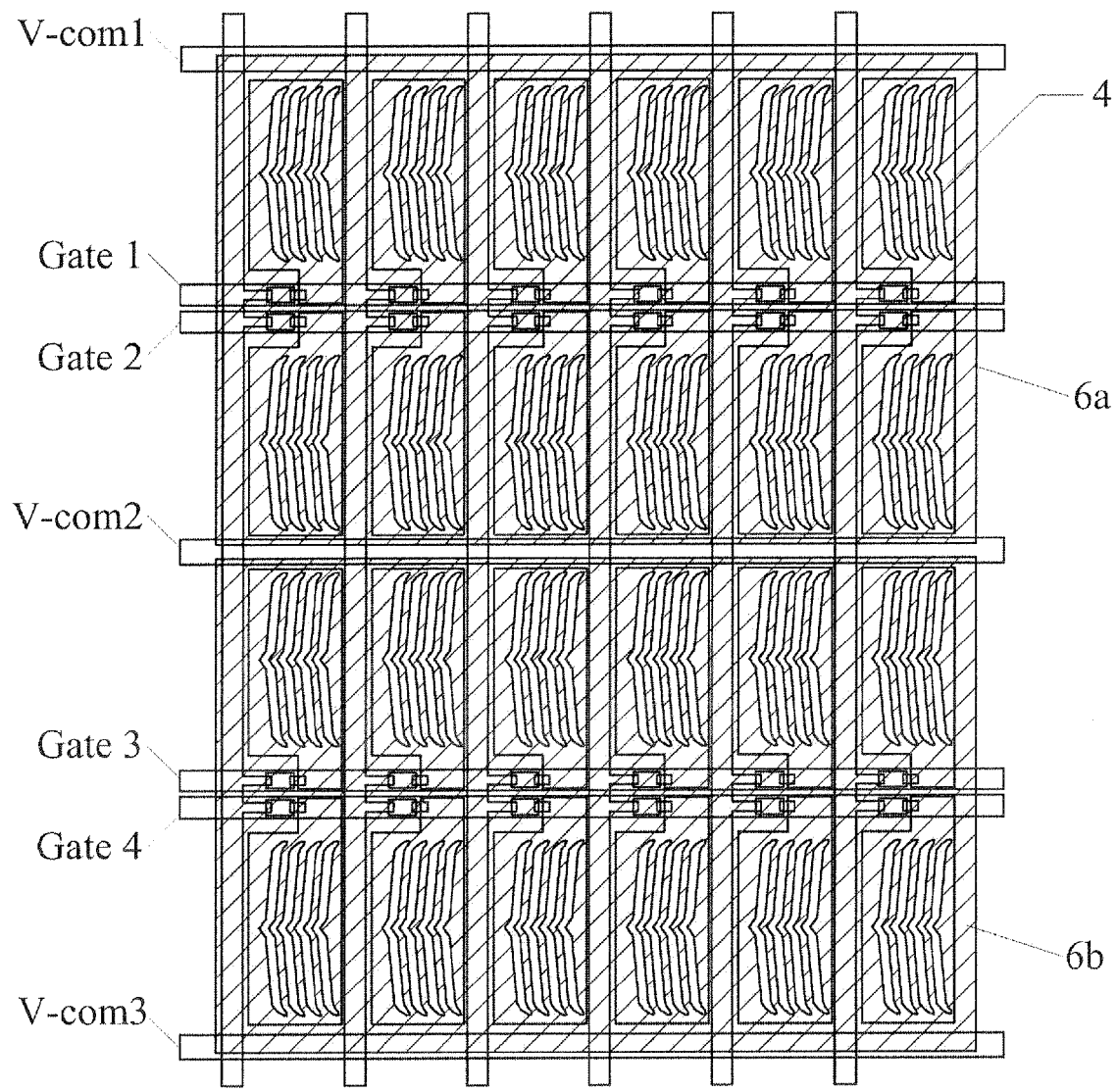
FIG. 5 is a schematic view of another example structure of a TFT array substrate according to an embodiment of the present invention.

In a specific embodiment, according to the number of the rows of the pixel units that each touch driving electrode 6 corresponds to, corresponding common electrode signal lines may be set. For example, as shown in FIG. 4, one touch driving electrode 6 corresponds to four rows of pixel units, so that one of the three common electrode signal lines V-com1, V-com2, and V-com3 can be selected to provide the common electrode signal; in addition, in a specific embodiment, it is possible to provide only one of the above three common electrode signal lines V-com1, V-com2, and V-com3 and not provide the other two common electrode signal lines, so as to ensure the aperture ratio to be maximum. Taking another example, as shown in FIG. 5, each of the two touch driving electrodes 6*a*, 6*b* corresponds to two rows of pixel units, so one of the two common electrode signal lines V-com1 and V-com 2 may be selected to provide the common electrode signal to the touch driving electrode 6*a* and one of the two common electrode signal lines V-com2 and V-com3 may be selected to provide the common electrode signal to the touch driving electrode 6*b*; as for the common electrode signal line V-com2, it may be only connected to one of the touch driving electrodes 6*a* and 6*b* to provide the common electrode signal to the single electrode, or it may be connected to the touch driving electrode 6*a* and the touch driving electrode 6*b* simultaneously to provide the common electrode signal to both of them. In a specific embodiment, it is necessary to design connection relationship between the common electrode signal lines and the corresponding touch driving electrodes according to the specific touch accuracy, the number and positions of the common electrode signal lines may be selectively set according to the size of the touch panel and it is not limited herein.

A particular structure of the touch sensing electrode provided on the color filter substrate of the touch panel according to the present invention will be described in detail.

In a specific embodiment, the touch sensing electrode 5 located on the color filter substrate 1 may be arranged between the base substrate of the color filter substrate 1 and a color resin layer, or on a surface of the color resin layer of the color filter substrate 1 facing the liquid crystal layer 3.

Figure 6:
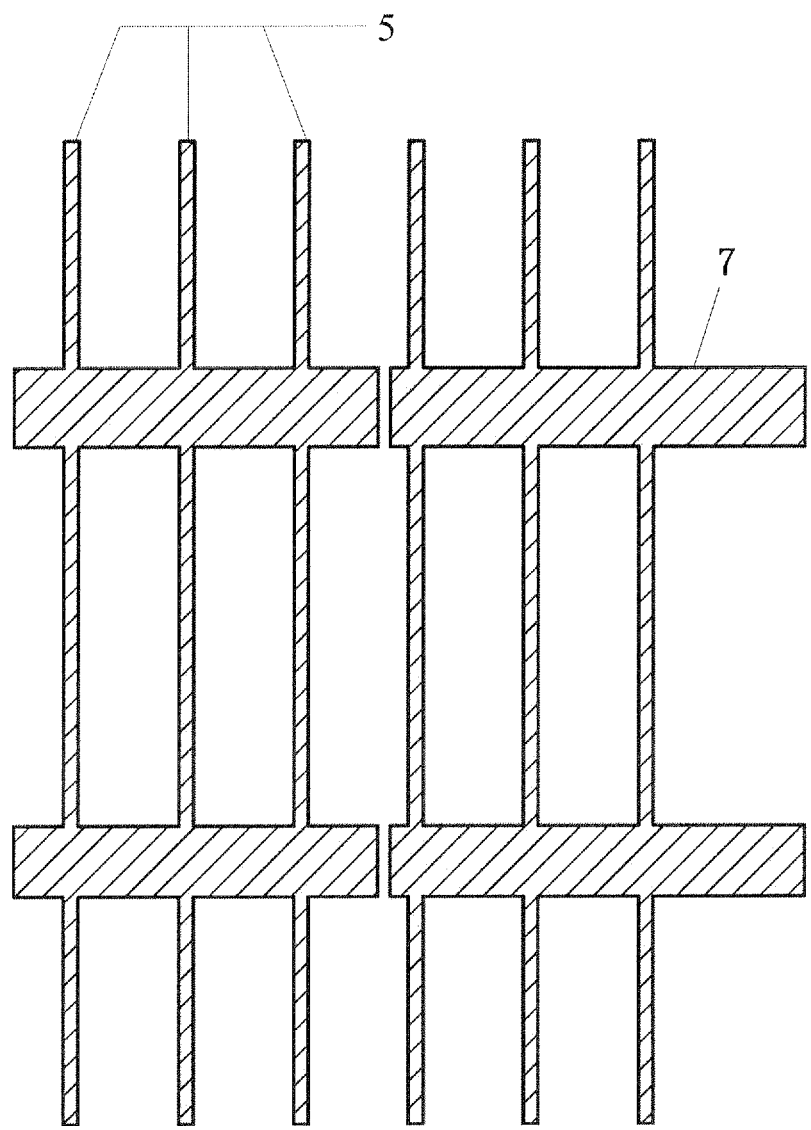
FIG. 6 is a graphically schematic view of touch sensing electrodes according to an embodiment of the present invention.

In particular, each touch sensing electrode 5 is comprised of at least one longitudinal sensing sub-electrode. As shown in FIG. 6, one touch sensing electrode 5 is comprised of three longitudinal sensing sub-electrodes and the touch sensing electrode 5 is generally arranged on an area that the black matrix of the color filter substrate 1 corresponds to, thus not affecting aperture ratio of the touch panel. So each longitudinal sensing sub-electrode 5 has a projection located between two adjacent columns of pixel units on the TFT array substrate 2, that is, each longitudinal sensing sub-electrode 5 corresponds to a data signal line on the TFT array substrate 1.

Further, each touch sensing electrode 5 may further include at least one lateral sensing sub-electrode 7 which connects all the longitudinal sensing sub-electrodes of the same touch sensing electrode 5, that is, all the longitudinal sensing sub-electrodes of the same touch sensing electrode 5 are electrically connected via the lateral sensing sub-electrode 7. Similarly, in order to not affect aperture ratio of the touch panel, each lateral sensing sub-electrode 7 has a projection located at the gate signal lines between two adjacent rows of pixel units 4 on the TFT array substrate 2, that is, each lateral sensing sub-electrode 7 corresponds to two adjacent gate signal lines on the TFT array substrate 2. The lateral sensing sub-electrode 7 arranged in each touch sensing electrode 5 can increase the inductive capacitance between the touch driving electrode 6 and the touch sensing electrode 5, facilitating detection of the touch signal by the touch sensing electrode 5.

In a specific embodiment, width of each touch sensing electrode 5, the number and density of the lateral sensing sub-electrodes 7 and the longitudinal sensing sub-electrodes 5 included in each touch sensing electrode 5 may be set according to the required touch accuracy, and the description thereof will be omitted.

Figure 7:
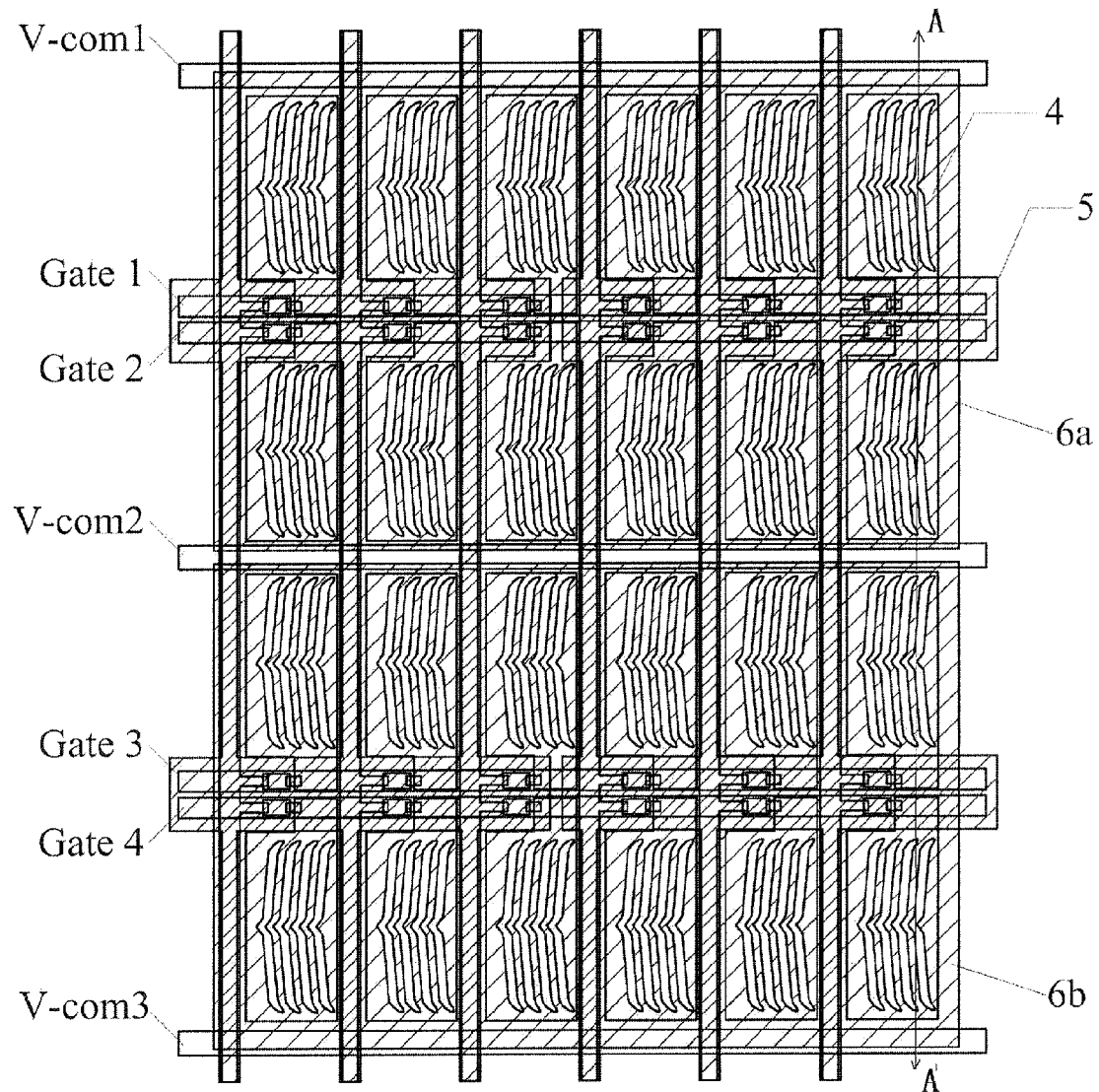
FIG. 7 is a schematic view of a structure of a color filter substrate and a TFT array substrate according to an embodiment of the present invention after they are aligned to form a liquid crystal cell.

FIG. 7 illustrates a schematic view of the color filter substrate 1 and the TFT array substrate 2 which are assembled together. Since the touch sensing electrode 5 arranged on the color filter substrate 1 will not block the pixel units 4, the touch sensing electrode 5 may be an ITO electrode or a metal electrode, and when the touch sensing electrode 5 is made by the metal electrode, resistance of the touch sensing electrode 5 can be reduced efficiently. FIG. 1 illustrates the cross-sectional view taken along the line A-A' in FIG. 7.

Figure 8:
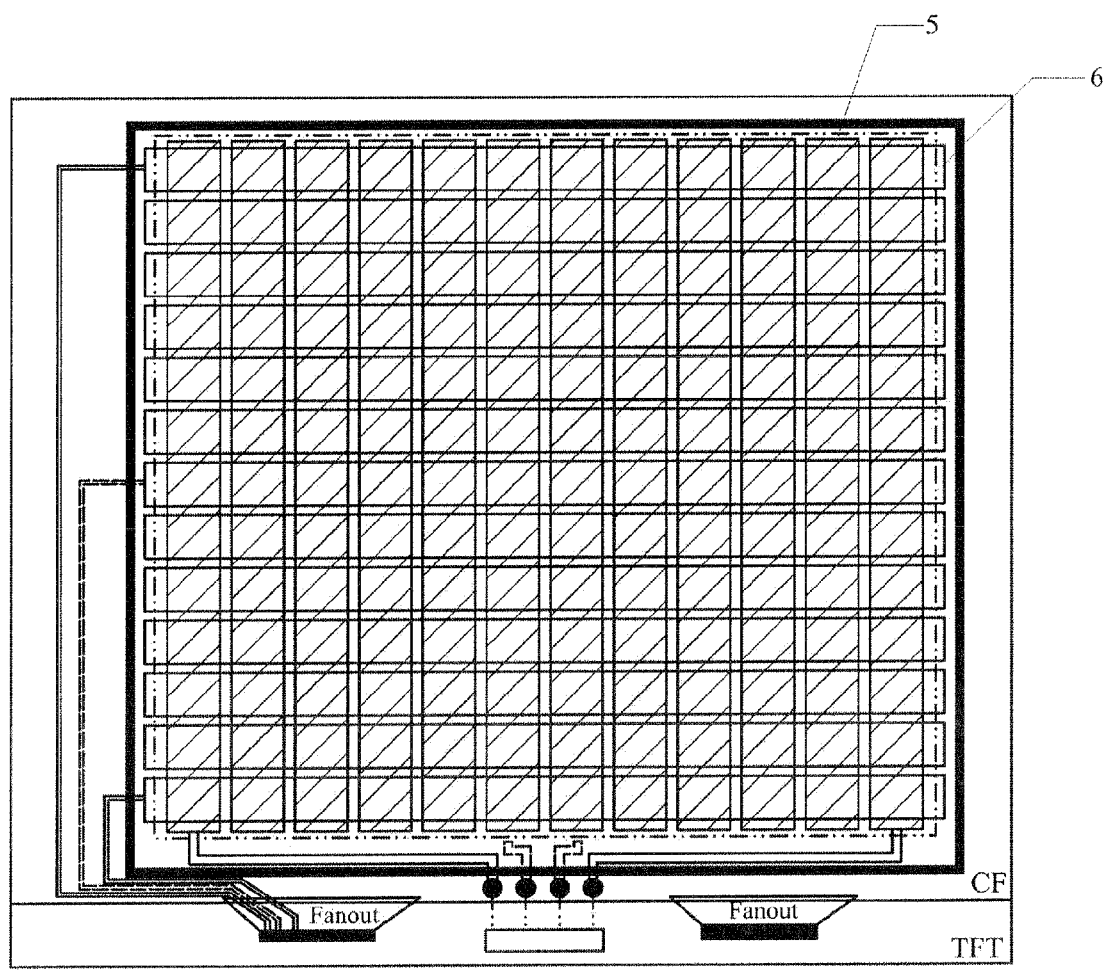
FIG. 8 is a wiring layout of a touch panel according to an embodiment of the present invention.

FIG. 8 is a wiring diagram of the touch panel according to the embodiment of the present invention after the color filter substrate and the TFT array substrate are aligned to form the liquid crystal cell. In FIG. 8, for the sake of clarity, each touch sensing electrode 5 is drawn to be a strip-shaped electrode structure and its actual structure is similar to the grid-shaped structure illustrated in FIG. 6. From FIG. 8, it can be seen that inductive capacitors can be formed between the touch sensing electrodes 5 and the touch driving electrodes 6 and capacitance of the inductive capacitors may be adjusted by adjusting densities of the touch sensing electrodes 5 and the touch driving electrodes 6.

Base on the same inventive concept, the present invention also provides a display device which includes the above capacitive in cell touch panel according to the embodiments of the present invention, and implementation of the display device may be referred to the embodiments of the above capacitive in cell touch cell and the description thereof will be omitted.

In the capacitive in cell touch panel and the display device according to the present invention, the touch sensing electrodes are provided on the color filter substrate, the whole common electrode layer of the TFT array substrate is segmented into a plurality of strip-shaped structures to function as the touch driving electrodes, and the touch driving electrodes are driven in a time-sharing manner to achieve the touch function and the display function in a time-sharing manner. Since in the touch panel according to the present invention, the structure of the common electrode layer of the TFT array substrate is altered to form the touch driving electrodes so that the altered common electrode layer has both the common electrode function and the touch driving function, it is not necessary to add a new film on the existing TFT array substrate so that the resultant TFT array substrate is simple in structure, and only an additional process is required to segment the whole common electrode layer into a plurality of strip-shaped structures so that the production cost is reduced and the production efficiency is increased. Moreover, since the touch function and the display function are driven in a time-sharing manner, on one hand the chip for driving the display function and the chip for driving the touch function can be integrated together so as to further reduce the production cost, and on the other hand mutual interference between the display function and the touch function can also be reduced by a time-sharing driving so that the image quality and the touch accuracy can be improved.

Obviously, persons skilled in the art can make various modifications and variations to the present invention without departing from the spirit and the scope of the invention. The present invention is intended to include those modifications and variations if they belong to the scope of the claims and their equivalents.

The invention claimed is:

1. A capacitive in cell touch panel, including: a color filter substrate, a TFT array substrate, and a liquid crystal layer enclosed between the color filter substrate and the TFT array substrate, a plurality of pixel units arranged in a matrix form are provided on the TFT array substrate, wherein,
    the color filter substrate includes a plurality of touch sensing electrodes extending along the column direction of the plurality of pixel units;
    the TFT array substrate includes a plurality of touch driving electrodes extending along the row direction of the plurality of pixel units, the touch driving electrodes together constitute a common electrode layer of the TFT array substrate; and
    within a time period for displaying one frame of images, the touch driving electrodes are used for transferring common electrode signals and touch scanning signals in a time-sharing manner.

2. A capacitive in cell touch panel according to claim 1, wherein each of the plurality of touch driving electrodes corresponds to a plurality of rows of pixel units.

3. A capacitive in cell touch panel according to claim 2, wherein every two adjacent rows of pixel units in the TFT array substrate forms a pixel units set, and two gate signal lines are provided between the two adjacent rows of pixel units in the pixel units set to provide gate scanning signals to the two adjacent rows of pixel units respectively.

4. A capacitive in cell touch panel according to claim 3, wherein a common electrode signal line is provided at a gap between two adjacent pixel units sets and the common electrode signal line is electrically connected to a corresponding touch driving electrode.

5. A capacitive in cell touch panel according to claim 4, wherein each of the plurality of touch driving electrodes is configured to have slit-shaped ITO electrodes at positions corresponding to aperture areas of the pixel units, and the plurality of touch driving electrodes are arranged above the pixel electrodes of the TFT array substrate.

6. A capacitive in cell touch panel according to claim 3, wherein each of the plurality of touch driving electrodes is configured to have slit-shaped ITO electrodes at positions corresponding to aperture areas of the pixel units, and the plurality of touch driving electrodes are arranged above the pixel electrodes of the TFT array substrate.

7. A capacitive in cell touch panel according to claim 2, wherein each of the plurality of touch driving electrodes is configured to have slit-shaped ITO electrodes at positions corresponding to aperture areas of the pixel units, and the plurality of touch driving electrodes are arranged above the pixel electrodes of the TFT array substrate.

8. A capacitive in cell touch panel according to claim 1, wherein each of the plurality of touch driving electrodes is configured to have slit-shaped ITO electrodes at positions corresponding to aperture areas of the pixel units, and the plurality of touch driving electrodes are arranged above the pixel electrodes of the TFT array substrate.

9. A capacitive in cell touch panel according to claim 1, wherein the plurality of touch sensing electrodes are arranged between a base substrate of the color filter substrate and color resin layer, or arranged on a surface of the color resin layer of the color filter substrate facing the liquid crystal layer.

10. A capacitive in cell touch panel according to claim 9, wherein each of the plurality of touch sensing electrodes includes at least one longitudinal sensing sub-electrode having a projection located between two adjacent columns of pixel units on the TFT array substrate.

11. A capacitive in cell touch panel according to claim 10, wherein each of the plurality of touch sensing electrodes includes at least one lateral sensing sub-electrode having a projection located at a gate signal line between two adjacent rows of pixel units on the TFT array substrate, and all the longitudinal sensing sub-electrodes of the same touch sensing electrode are electrically connected via the lateral sensing sub-electrode.

12. A capacitive in cell touch panel according to claim 11, wherein the touch sensing electrode includes an ITO electrode or a metal electrode.

13. A capacitive in cell touch panel according to claim 10, wherein the touch sensing electrode includes an ITO electrode or a metal electrode.

14. A display device, including the capacitive in cell touch panel according to claim 1.

* * * * *